US012629925B2

(12) United States Patent
Johnson et al.

(10) Patent No.: US 12,629,925 B2
(45) Date of Patent: May 19, 2026

(54) MULTI-LAYER ISOTROPIC FILMS HAVING TOUGHNESS, HIGH TEMPERATURE PERFORMANCE, AND UV ABSORPTION

(71) Applicant: 3M INNOVATIVE PROPERTIES COMPANY, St. Paul, MN (US)

(72) Inventors: Stephen A. Johnson, Woodbury, MN (US); Derek W. Patzman, Savage, MN (US); Richard Yufeng Liu, Woodbury, MN (US); Victor Ho, St. Paul, MN (US); Timothy J. Hebrink, Scandia, MN (US); Kevin T. Huseby, Oakdale, MN (US); John F. VanDerlofske, III, Minneapolis, MN (US); John P. Purcell, Oakdale, MN (US); William T. Fay, Woodbury, MN (US); James B. Svacha, Simpsonville, SC (US); Richard J. Thompson, Lino Lakes, MN (US); Timothy J. Lindquist, Woodbury, MN (US); Kristopher J. Derks, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/669,840

(22) Filed: May 21, 2024

(65) Prior Publication Data

US 2024/0383241 A1     Nov. 21, 2024

Related U.S. Application Data

(62) Division of application No. 16/630,132, filed as application No. PCT/US2018/045694 on Aug. 8, 2018, now abandoned.

(Continued)

(51) Int. Cl.
B32B 27/08     (2006.01)
B32B 7/02     (2019.01)
(Continued)

(52) U.S. Cl.
CPC ................ B32B 27/08 (2013.01); B32B 7/02 (2013.01); B32B 27/32 (2013.01); B32B 27/36 (2013.01);
(Continued)

(58) Field of Classification Search
None
See application file for complete search history.

(56) References Cited

U.S. PATENT DOCUMENTS 6,498,683 B2     12/2002     Condo et al.
6,521,329 B2     2/2003     Aylward et al.
(Continued)

FOREIGN PATENT DOCUMENTS

JP     2004216824 A     8/2004
KR     1020140085219 A     7/2014
(Continued)

OTHER PUBLICATIONS

Kraton Corp., Kraton G1645 V Data Document (Year: 2019).*
(Continued)

*Primary Examiner* — Frank J Vineis
*Assistant Examiner* — Nicole T Gugliotta
(74) *Attorney, Agent, or Firm* — Clifton F. Richardson; Lance Vietzke

(57)     ABSTRACT

Multi-layer films, and processes to make the films, that enable the delivery of a substrate featuring a peelable thin layer of low haze, amorphous, isotropic film with the desired properties of high modulus, high usage temperature, UV blockage, and toughness. The films are made using a co-extrusion, co-orientation and annealing process to enable the (Continued)

delivery of a thin isotropic, UV blocking layer on top of a release layer and support substrate. These film constructions can be kept together during additional processing steps such as coating and converting. The release and dimensionally stable substrate layer can be easily removed once processing steps are completed.

1 Claim, 3 Drawing Sheets

Related U.S. Application Data

(60) Provisional application No. 62/542,507, filed on Aug. 8, 2017.

(51) Int. Cl.

| | |
|---|---|
| *B32B 7/06* | (2019.01) |
| *B32B 7/12* | (2006.01) |
| *B32B 27/30* | (2006.01) |
| *B32B 27/32* | (2006.01) |
| *B32B 27/36* | (2006.01) |
| *B32B 37/14* | (2006.01) |
| *B32B 37/26* | (2006.01) |
| *B32B 38/00* | (2006.01) |

(52) U.S. Cl.

CPC ................... *B32B 2037/268* (2013.01); *B32B 2038/0028* (2013.01); *B32B 2038/0048* (2013.01); *B32B 2250/05* (2013.01); *B32B 2250/24* (2013.01); *B32B 2250/40* (2013.01); *B32B 2307/42* (2013.01); *B32B 2307/514* (2013.01); *B32B 2307/708* (2013.01)

(56) References Cited

U.S. PATENT DOCUMENTS

| | | | |
|---|---|---|---|
| 6,555,190 | B1 | 4/2003 | Tsai |
| 6,569,515 | B2 | 5/2003 | Hebrink et al. |
| 6,632,522 | B1* | 10/2003 | Hyde ..................... C09J 133/06 |
| | | | 524/505 |
| 6,787,219 | B2 | 9/2004 | Peiffer et al. |

| | | | |
|---|---|---|---|
| 8,263,731 | B2 | 9/2012 | Liu et al. |
| 2001/0009714 | A1 | 7/2001 | Wheatley et al. |
| 2004/0219338 | A1 | 11/2004 | Hebrink et al. |
| 2006/0084780 | A1 | 4/2006 | Hebrink et al. |
| 2006/0093809 | A1 | 5/2006 | Hebrink et al. |
| 2006/0159888 | A1 | 7/2006 | Hebrink et al. |
| 2006/0232863 | A1 | 10/2006 | Nevitt et al. |
| 2006/0272766 | A1 | 12/2006 | Hebrink et al. |
| 2008/0083999 | A1 | 4/2008 | Merrill et al. |
| 2009/0035591 | A1 | 2/2009 | Nishikawa et al. |
| 2010/0183891 | A1 | 7/2010 | Mills et al. |
| 2010/0214762 | A1 | 8/2010 | Nevitt et al. |
| 2013/0095338 | A1* | 4/2013 | Lu .......................... B32B 27/327 |
| | | | 264/173.15 |
| 2014/0065397 | A1 | 3/2014 | Johnson et al. |
| 2015/0183178 | A1* | 7/2015 | Lindquist ................ B32B 27/36 |
| | | | 428/137 |

FOREIGN PATENT DOCUMENTS

| | | | | |
|---|---|---|---|---|
| WO | 1994013475 | A1 | 6/1994 | |
| WO | WO-9936248 | A2 * | 7/1999 | ........... B29C 48/865 |
| WO | 2002095456 | A2 | 11/2002 | |
| WO | 2004099832 | A1 | 11/2004 | |
| WO | 2006132875 | A1 | 12/2006 | |
| WO | 2008157243 | A1 | 12/2008 | |
| WO | 2011062836 | A1 | 5/2011 | |
| WO | 2011062932 | A1 | 5/2011 | |
| WO | 2014035849 | A1 | 3/2014 | |
| WO | 2015178365 | A1 | 11/2015 | |
| WO | 2016097292 | A1 | 6/2016 | |
| WO | 2017003870 | A1 | 1/2017 | |
| WO | 2019108423 | A2 | 6/2019 | |
| WO | 2019108425 | A1 | 6/2019 | |
| WO | 2019162832 | A1 | 8/2019 | |

OTHER PUBLICATIONS

Kraton Corp., Kraton G1657 M Data Document (Year: 2024).*
International Search Report for PCT International Application No. PCT/US2018/045694, mailed on Nov. 30, 2018, 4 pages.
Leech, "Effect of Norbornene Content on Deformation Properties and Hot Embossing of Cyclic Olefin Copolymers", Journal of Material Science, 2010, vol. 45, pp. 5364-5369.

* cited by examiner

MULTI-LAYER ISOTROPIC FILMS HAVING TOUGHNESS, HIGH TEMPERATURE PERFORMANCE, AND UV ABSORPTION

CROSS REFERENCE TO RELATED APPLICATIONS

This application is a divisional of U.S. application Ser. No. 16/630,132, filed Jan. 10, 2020, pending, which is a 371 of PCT/US2018/045694, filed Aug. 8, 2018, which claims benefit of U.S. Provisional Application Ser. No. 62/542,507, filed Aug. 8, 2017, the disclosures of which are incorporated by reference in their entireties herein.

BACKGROUND

For many film applications, especially electronic devices, manufacturers want thinner and lighter design components. As a result, there is a high desire to deliver thin substrates for many applications. Furthermore, some of these applications are attempting to minimize any optical loss, absorption and haze, associated with the substrate film. Additionally, many applications are sensitive to de-polarization of light and thus require a highly isotropic substrate. High modulus, high usage temperature and reasonable toughness (non-brittle) substrates are also desired for both process handling steps as well as the end application. Finally, many integrated display substrates need to provide some level of ultraviolet (UV) light blockage to protect some of the materials deeper (away from the light source) in the display matrix.

Isotropic low haze films are known. For example, acrylic and COC sheets/rolls are available in the marketplace. However, these films suffer from challenging physical properties, and thin versions of isotropic films such as these (or copolyesters) are extremely expensive, if available at all, and are very challenging to work with. Also, these films do not inherently provide for the required amount of UV light blockage.

SUMMARY

A first multi-layer film includes, in the following order, an orienting layer, a peel layer, and an isotropic layer. The orienting layer, the peel layer, and the isotropic layer all comprise an extrudable material and are oriented.

A second multi-layer film includes, in the following order, a first orienting layer, a first peel layer, an isotropic layer, a second peel layer, and a second orienting layer. The first and second orienting layers, the first and second peel layers, and the isotropic layer all comprise an extrudable material and are oriented.

A third multi-layer film includes, in the following order, a first isotropic layer, a first peel layer, an orienting layer, a second peel layer, and a second isotropic layer. The first and second isotropic layers, the first and second peel layers, and the orienting layer all comprise an extrudable material and are oriented.

A fourth multi-layer film includes, in the following order, a first isotropic layer, an orienting layer, a tie layer, a peel layer, and a second isotropic layer. The first and second isotropic layers, the tie layer, and the peel layer all comprise an extrudable material and are oriented.

A fifth multi-layer film includes, in the following order, a first isotropic layer, a first peel layer, a first tie layer, an orienting layer, a second tie layer, a second peel layer, and a second isotropic layer. The first and second isotropic layers, the first and second peel layers, the first and second tie layers, and the orienting layer all comprise an extrudable material and are oriented.

A sixth multi-layer film includes, in the following order, a first orienting layer, an isotropic layer, and a second orienting layer. The first and second orienting layers and the isotropic layer all comprise an extrudable material and are oriented.

A seventh multi-layer film includes, in the following order, a first isotropic layer, an orienting layer, and a second isotropic layer. The orienting layer and the first and second isotropic layers all comprise an extrudable material and are oriented.

An eighth multi-layer film includes, in the following order, a first orienting layer, a first isotropic layer, a tie layer, a second isotropic layer, and a second orienting layer. The first and second orienting layers, the first and second isotropic layers, and the tie layer all comprise an extrudable material and are oriented.

A ninth multi-layer film includes, in the following order, a first orienting layer, a tie layer, and a second orienting layer. The first and second orienting layers and the tie layer all comprise an extrudable material and are oriented.

Other multi-layer films include any of these nine or other embodiments with an extruded, but not oriented, carrier layer instead of an orienting layer and with the other layers not necessarily being extrudable nor oriented.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Embodiments of this invention include multi-layer films, and processes to make the films, that enable the delivery of a substrate featuring a peelable thin layer of low haze, amorphous, isotropic film with the desired properties of high modulus, high usage temperature, UV blockage, and toughness.

A multi-layer co-extrusion, co-orientation and annealing process is used to enable the delivery of a thin isotropic, UV blocking layer on top of a release layer and support substrate. These film constructions can be kept together during additional processing steps such as coating and converting. The release and dimensionally stable substrate layer can be easily removed once processing steps are completed.

To provide a film with the above-listed characteristics, alternate manufacturing methods could be attempted such as extrusion coating or solvent coating a layer of the desired polymeric material onto a carrier backing.

Solvent coating the exemplary isotropic materials for the multi-layer films of this invention would be challenging, as solubility of higher MW (20,000+ amu) aromatic polyesters is very limited. Low solids, and undesirable solvent choices such as trifluoroacetic acid or o-cholorbenzene/phenol are two examples of the limited set of solvents which can provide some level of solubility.

Extrusion coating wide clean, uniform layers of material can also be quite challenging. Thin extrusion coated layers are frequently limited by melt integrity, line speed capability and caliper control, and tend to have a lower bound of around 20 microns. Additionally, the co-extrusion process itself imparts a degree of birefringence/retardance to many polymers, including the materials used in the multi-layer films of this invention.

Thin, low haze films that exhibit surprisingly low isotropic performance have been made through a process which involves co-extrusion with a carrier substrate providing dimensional stability and a peel layer, co-orientation of the layers of film and annealing the film. The orientation and annealing process for the multi-layer films of the present invention reduces the birefringence/retardance to desirable levels. In addition, the co-extrusion process for the multi-layer films of the present invention can provide pristine clean surfaces and avoids the surface defects and die build-up (oligomer) issues typical to the extrusion coating process. Thus, through judicious choice of materials and process conditions, thin, low haze, tough, UV blocking and isotropic film articles have been produced.

The following are illustrative configurations of the multi-layer film articles. Materials for the various layers, and processes to make the articles, are further described below.

Figures 1, 2, 3, 4:
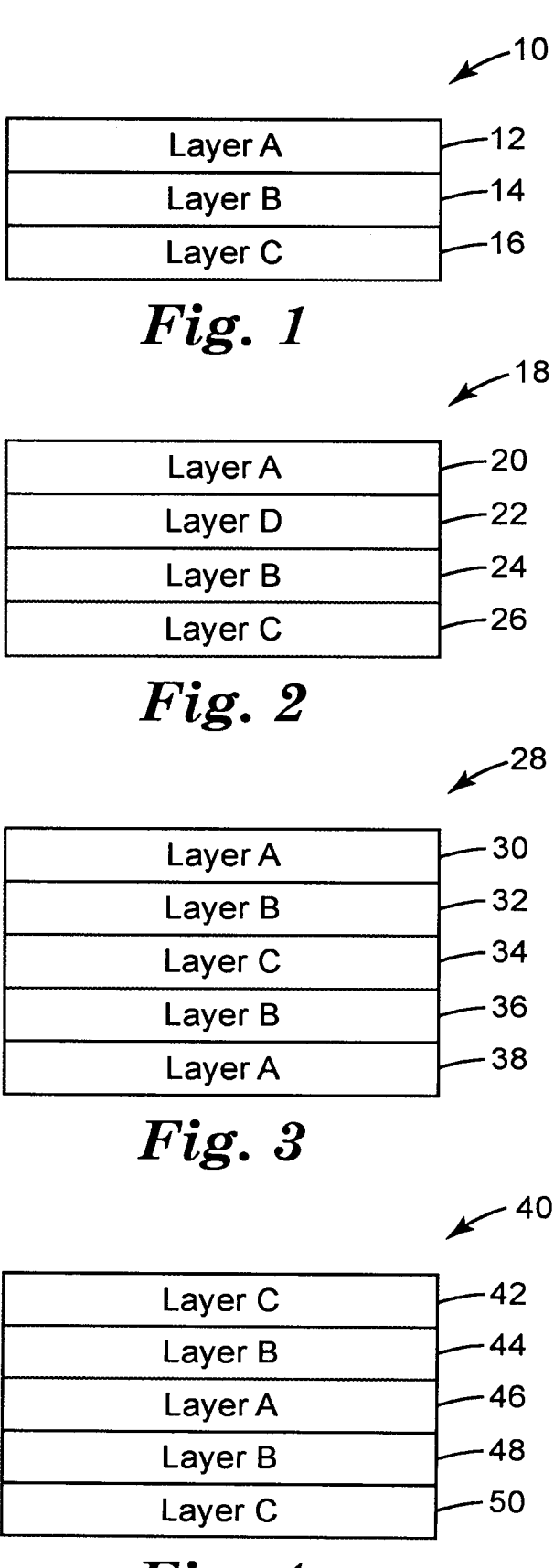
FIG. 1 is a side view of a three-layer film embodiment.
FIG. 2 is a side view of a four-layer film embodiment.
FIG. 3 is a side view of a five-layer film embodiment.
FIG. 4 is a side view of a five-layer film embodiment.

FIG. 1 is a side view of a three-layer film 10 having an ABC layer configuration. Film 10 includes the following layers in the configuration as shown: an orienting Layer A (12); a peel Layer B (14); and an isotropic Layer C (16). This configuration of film 10 provides for an isotropic layer (Layer C) with the stabilizing Layer A and the peel Layer B.

FIG. 2 is a side view of a four-layer film 18 having an ADBC layer configuration. Film 18 includes the following layers in the configuration as shown: an orienting Layer A (20); a tie Layer D (22); a peel Layer B (24); and an isotropic Layer C (26). This configuration of film 18 provides the additional capability of controlling where the first separation of layers will occur, in this case between the Layers B and C.

FIG. 3 is a side view of a five-layer film 28 having an ABCBA layer configuration. Film 28 includes the following layers in the configuration as shown: an orienting Layer A (30); a peel Layer B (32); an isotropic Layer C (34); a peel Layer B (36); and an orienting Layer A (38). This configuration of film 28 enables pristine, sterile surfaces of the isotropic layer (Layer C).

FIG. 4 is a side view of a five-layer film 40 having a CBABC layer configuration. Film 40 includes the following layers in the configuration as shown: an isotropic Layer C (42); a peel Layer B (44); an orienting Layer A (46); a peel Layer B (48); and an isotropic Layer C (50). This configuration of film 40 enables dual production of the isotropic layers (Layer C).

Figures 5, 6, 7, 8:
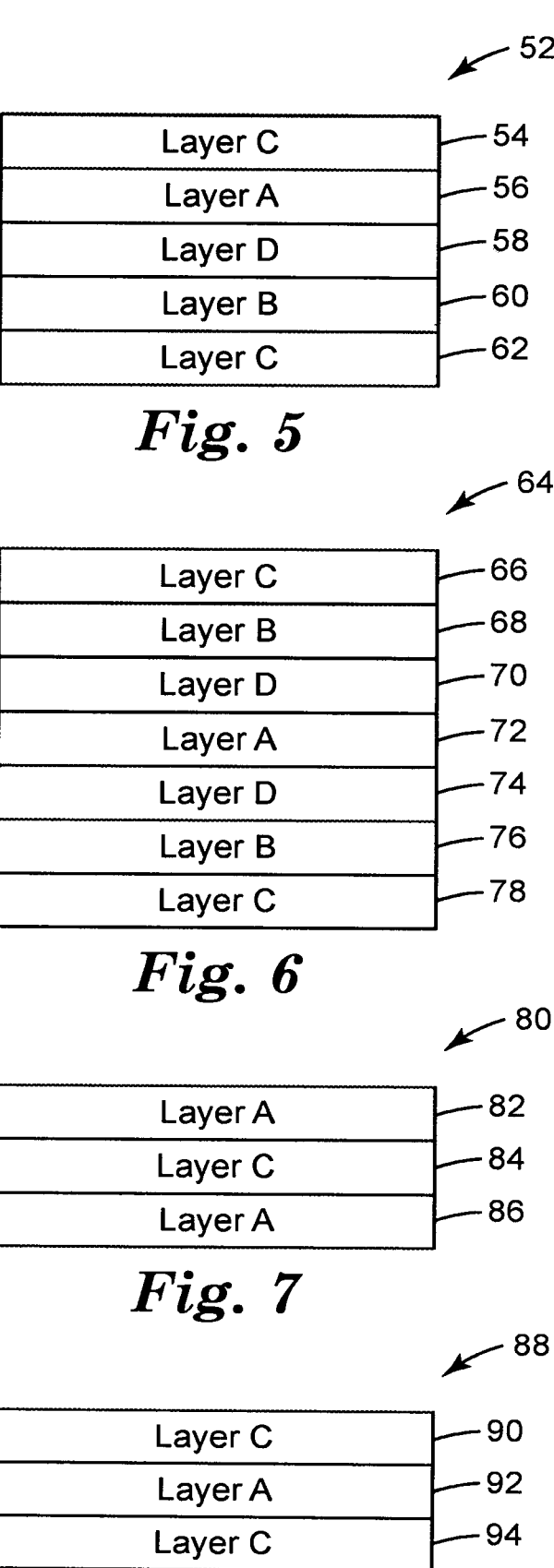
FIG. 5 is a side view of a five-layer film embodiment.
FIG. 6 is a side view of a seven-layer film embodiment.
FIG. 7 is a side view of a three-layer film embodiment.
FIG. 8 is a side view of a three-layer film embodiment.

FIG. 5 is a side view of a five-layer film 52 having a CADBC layer configuration. Film 52 includes the following layers in the configuration as shown: an isotropic Layer C (54); an orienting Layer A (56); a tie Layer D (58); a peel Layer B (60); and an isotropic Layer C (62). This configuration of film 52 enables controlled release of the isotropic layer (Layer C) and also enables superior curl control of the film.

FIG. 6 is a side view of a seven-layer film 64 having a CBDADBC layer configuration. Film 64 includes the following layers in the configuration as shown: an isotropic Layer C (66); a peel Layer B (68); a tie Layer D (70); an orienting Layer A (72); a tie Layer D (74); a peel Layer B (76); and an isotropic Layer C (78). This configuration of film 64 combines controlled release and dual production of the isotropic layers (Layer C).

FIG. 7 is a side view of a three-layer film 80 having an ACA layer configuration. Film 80 includes the following layers in the configuration as shown: an orienting Layer A (82); an isotropic Layer C (84); and an orienting Layer A (86). This configuration of film 80 provides for an isotropic layer (Layer C) with the stabilizing layers (Layers A).

FIG. 8 is a side view of a three-layer film 88 having a CAC layer configuration. Film 88 includes the following layers in the configuration as shown: an isotropic Layer C (90); an orienting Layer A (92); and an isotropic Layer C (94). This configuration of film 88 enables dual production of the isotropic layers (Layers C).

Figure 9:
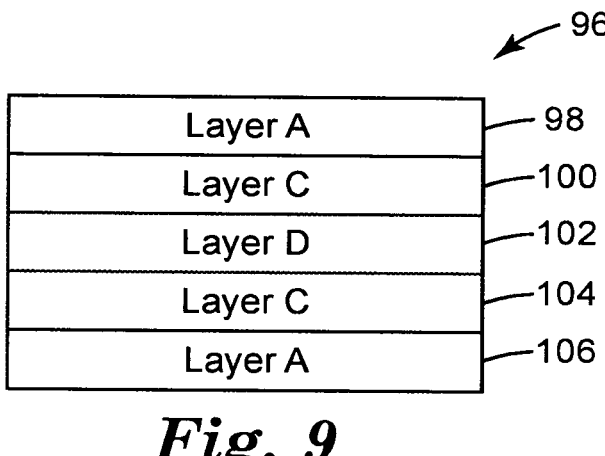
FIG. 9 is a side view of a five-layer film embodiment.

FIG. 9 is a side view of a five-layer film 96 having an ACDCA layer configuration. Film 96 includes the following layers in the configuration as shown: an orienting Layer A (98); an isotropic Layer C (100); a tie Layer D (102); an isotropic Layer C (104); and an orienting Layer A (106). This configuration of film 96 enables additional functionality of the isotropic layers (Layers C) by incorporating a polymer material (Layer D) between the isotropic layers.

Figure 10:
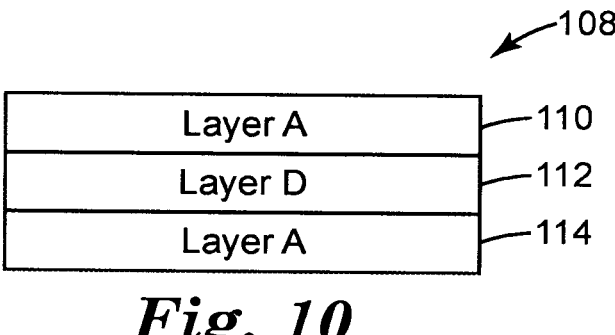
FIG. 10 is a side view of a three-layer film embodiment.

FIG. 10 is a side view of a three-layer film 108 having an ADA layer configuration. Film 108 includes the following layers in the configuration as shown: an orienting Layer A (110); a tie Layer D (112); and an orienting Layer A (114). This configuration of film 108 enables a single layer of thermoplastic material (Layer D) with the stabilizing layers (Layers A).

As further described in the Examples, the multi-layer film constructions of FIGS. 1-10 can be made by co-extrusion of the materials for the layers, followed by orientation and annealing of the co-extruded layer materials.

Materials sets utilized in making these multi-layer films include the following.

The Layer A materials are preferably PEN or Low Melt PEN which are available from 3M Company. PEN can be described as a 0.48 IV polyethylene naphthalate polymer. Low Melt PEN can be described as a 0.48 IV copolyester comprised of 90 mol % naphthalate moieties and 10 mol % terephthalate moieties on an esters basis. Ethylene glycol comprises the diols in this polymer. The Layer A is an orienting layer that serves as the carrier vehicle, support substrate, enabling flat film production during both the orientation and annealing process. Post-annealing, the Layer A serves to provide high modulus and dimensional stability.

The Layer B materials are preferably a blend of the following materials: a polypropylene or co-polypropylene capable of co-extrusion and co-orientation with the A, C and D Layers. An example of these materials is Pro-Fax SR549M, a co-polypropylene (7% polyethylene) available from Lyondell-Basell. These polypropylenes comprise 70 or more wt % of the Layer B and are a blend with one or more of the following: an SEBS/SEPS block copolymer capable of co-extrusion and co-orientation with the Layers A, C and D. Examples of these materials include Kraton G1645 and Kraton G1657 available from the Kraton Corporation. The Layer B may also contain an olefinic antistat agent capable of co-extrusion and co-orientation with the Layers A, C, and D, which will enhance electrostatic pinning in the film casting process. An exemplary antistat resin is Pelestat 230 available from Sanyo Chemical Industries. The Layer B is a peel layer designed to provide approximately 5 to 40 gli of adhesion to the Layers A or C.

The Layer C materials are preferably a coPEN polymer known as PENg. PENg30 is a coPEN polyester available from 3M Company. The manufacturing method and material composition (100% NDC on esters, 70 mol % ethylene glycol and 30 mol % CHDM on a diols basis) is more completely described in the Examples. PENg40 and PENg50 are also coPEN polyesters with 40 mol % and 50 mol % CHDM on a diols basis and are also more completely described in the Examples. The Layer C is an isotropic layer that provides the functionality of, for example, a peelable thin layer of low haze, amorphous, isotropic film with desired properties of high modulus, high usage temperature, UV blockage, and toughness.

The optional Layer D material or materials are most preferably an elastic olefin or olefin blend exhibiting excellent adhesion (>300 gli) to polyesters. These olefins must be capable of co-extrusion and co-orientation with the Layers A, B, and C. Exemplary elastic olefins include Kraton G1645 and Kraton G1657 available from the Kraton Corporation. These materials can also be blended with low levels of other materials such as SR549M or Pelestat 230 to tailor physical and adhesion properties and/or to enhance electrostatic pinning performance. The Layer D functions as a tie layer.

In other embodiments, a carrier layer can be used instead of an orienting layer. The carrier layer can be extruded but not oriented. An example of a carrier layer is polyethylene film. When such a carrier layer is used, the other layers of the film need not be extrudable nor oriented, and the film can be made using a blown film process, for example.

EXAMPLES

Examples 1 Through 3 and C1 Through C3: Copolyester Manufacture and Characterization A series of polyester copolymers were produced using the following procedure:

To a stainless steel 10-gallon reactor equipped with hot oil temperature control, an overhead separation column, and a vacuum pump, the following components were added at room temperature:

Dimethyl-2,6-Naphthalene Dicarboxylate (NDC)—obtained from Indorama Ventures, Decatur, AL Ethylene Glycol (EG)—obtained from Huntsman Petrochemical, The Woodlands, TX Cyclohexanedimethanol (CHDM)—obtained from Eastman Chemical, Kingsport, TN Tetrabutyl Titanate (TBT)—obtained from Dorf Ketal, Houston, TX Cobalt Acetate (CoAc)—obtained from Shepherd Chemical, Cincinnati, OH Zinc Acetate (ZnAc)—obtained from Mallinckrodt Baker, Phillipsburg, NJ Antimony Triacetate (SbAc)—obtained from Arkema, Philadelphia, PA The amount of each component charged to the reactor, for each Example and Comparative Example, is shown in Table 1.

The reactor contents were heated, while mixing at 125 rpm under 20 psig (140 kpa) of nitrogen. Over the course of about 2 hours, the transesterification reaction took place a t a temperature culminating at 495° F. (258 C). Product methanol was driven off through the separation column and collected in a receiver. The pressure in the kettle was then slowly reduced to atmospheric. In the case of Examples C1 and C2, Triethylphosphonoacetate (TEPA), obtained from Rhodia, Cranbury, NJ, was added as a stabilizer, in the amounts shown in Table 1. For each of these Examples and Comparative Examples, temperature was again increased and vacuum was applied to the kettle, and the vacuum was increased as batch viscosity allowed. Excess ethylene glycol was driven off. After about 2 hours at a temperature of about 545° F. (285 C) and a vacuum as low as about 1 mmHg (0.1 kpa), the reaction progressed to the desired endpoint (an intrinsic viscosity, or IV, of about 0.48 dL/g, as measured in a 60/40 wt % blend of phenol/o-chlorobenzene). The kettle was then drained and the resulting resin was cooled to room temperature, and was later ground into small pieces for further evaluation.

TABLE 1

| | Example | | | | | |
|---|---|---|---|---|---|---|
| | 1 | 2 | 3 | C1 | C2 | C3 |
| | | | Description | | | |
| | PEN w/30% CHDM | PEN w/40% CHDM | PEN w/50% CHDM | PEN w/10% CHDM | PEN w/15% CHDM | PEN w/60% CHDM |
| Acids/Esters (kg) | | | | | | |
| NDC | 18.61 | 17.72 | 16.81 | 17.64 | 17.42 | 16.08 |
| Diols (kg) | | | | | | |
| EG | 9.46 | 8.56 | 7.69 | 9.43 | 9.07 | 6.95 |
| CHDM | 3.30 | 4.19 | 4.97 | 1.01 | 1.50 | 5.70 |
| Catalysts (g) | | | | | | |
| TBT | 1.86 | 1.77 | 1.68 | | | 1.61 |
| CoAc | | | | 2.0 | 2.0 | |
| ZnAc | | | | 1.6 | 1.6 | |
| SbAc | | | | 8.9 | 8.9 | |
| Stabilizer (g) | | | | | | |
| TEPA | | | | 3.6 | 3.6 | |

A portion from each exemplary resin was then placed in a 150 C oven for 48 hours to induce cold crystallization. The cold-crystallized materials were then tested using Differential Scanning Calorimetry, or DSC (Q2000 commercially available from TA Instruments, New Castle, Del.). The test involved a 3-stage heating-cooling-heating temperature regimen over a temperature range from 30 C to 290 C. The test specimen was held at 290 C for 3 min after the first heat. The temperature-ramp rate was 20 C/min for both heating and cooling. Both the first heating scan and the second heating scan were recorded and analyzed. Table 2 captures the findings for melt point and associated melting enthalpy (delta H). In addition, the glass transition temperature, Tg, of each material is also listed.

TABLE 2

| | Example | | | | | |
|---|---|---|---|---|---|---|
| | 1 | 2 | 3 | C1 | C2 | C3 |
| | | | Description | | | |
| | PEN w/30% CHDM | PEN w/40% CHDM | PEN w/50% CHDM | PEN w/10% CHDM | PEN w/15% CHDM | PEN w/60% CHDM |
| Short Name | PENg30 | PENg40 | PENg50 | PENg10 | PENg15 | PENg60 |
| Melt Point, C. | 194 | Not detected | 209 | 245 | 237 | 246 |

TABLE 2-continued

| | Example | | | | | |
|---|---|---|---|---|---|---|
| | 1 | 2 | 3 | C1 | C2 | C3 |
| | | | Description | | | |
| | PEN w/30% CHDM | PEN w/40% CHDM | PEN w/50% CHDM | PEN w/10% CHDM | PEN w/15% CHDM | PEN w/60% CHDM |
| Delta H, J/g | 0.17 | 0 | 2.4 | 30 | 22 | 13.4 |
| Tg, C. | 118 | 117 | 116 | 119 | 118 | 117 |

Table 2 shows that Examples 1, 2 and 3, (PENg30, PENg40 and PENg50, respectively), exhibit melt points of 210 C or lower with little to no melting enthalpy (<3 J/g). The Tg of all six materials in this table were measured to be between 115 C and 120 C.

Examples 4 Through 6 and C4

A series of 3-component 5-layer films in an A/B/C/B/A layer configuration were produced via co-extrusion, stretching, and annealing. These five layer films used a layer configuration consistent with FIG. 3. For each of the three Examples and the Comparative Example, the A Layer resin was a PEN homopolymer of 0.48 IV, prepared in-house. The feed rate of the PEN was 4.54 kg/hr. For each, the B Layer resin was a 9:1 blend (by weight) of Pro-Fax SR549M, an 11 MFI (melt flow index) clarified polypropylene random copolymer obtained from Lyondell-Basell, Houston TX, and Kraton 1645, a 3 MFI Styrene-Ethylene/Butadiene-Styrene (SEBS) triblock copolymer obtained from Kraton Corporation, Houston TX. The feed rate of this blend was 2.27 kg/hr The C Layer resin varied among these Examples and Comparative Example. Ex. 4 used the resin of Ex. 1, PENg30, as C Layer resin. Ex. 5 used the resin of Ex. 2, PENg40, as C Layer resin. Ex. 6 used the resin of Ex. 3, PENg50, as C Layer resin. Comp. Ex. C4 used the resin of Ex. C3, PENg60, as C Layer resin. For each, the feed rate of the C Layer resin was 4.54 kg/hr.

For each film of Exs. 4-6 and Comp. Ex. C4, the outer, or A, Layers were produced by extruding PEN resin with a 27 mm twin screw extruder (TSE) through a gear pump and neck tube into the outer layers of a 5-layer feed block. This melt train used a progressive temperature extrusion profile, with peak temperature of about 285 C. The intermediate, or B, Layers were produced by feeding both of the above-identified resins to a 27 mm TSE having a progressive temperature profile peaking at about 260 C, then to and through a gear pump and neck tube, and into the $2^{nd}$ and $4^{th}$ layers of the 5-layer feed block. The core, or C, Layer was produced by extruding the above-identified resin through a 25 mm TSE with a gear pump and neck tube, feeding into the $3^{rd}$, or center, layer of the 5-layer feed block. Once again, a progressive temperature profile was used, with peak temperature of about 285 C. The feed block fed an 8" (20.3 cm) film die, and these were held at a temperature of about 285 C. The molten extrudate was cast to a casting wheel maintained at a temperature of about 50 C. Cast webs of about 36 mil (0.91 mm) thickness were produced during this process.

The cast webs produced from the extrusion and casting process were then stretched and annealed using a KARO IV lab stretcher obtained from Brueckner Maschinenbau, Siegsdorf, Germany. Stretching of the film took place in an oven at a temperature of about 140 C. Preheating duration was about 45 seconds. Films were stretched simultaneously biaxially to a final dimension of 350% by 350% of the original size, resulting in a finished film of about 3 mils (75 microns). These films were then conveyed into an annealing oven maintained at about 225 C and held at that temperature for 15 seconds. These stretched, annealed films were then evaluated for refractive index, haze, and transmission. The unstretched cast webs were also evaluated for refractive index. The results are shown in Table 3. All measurements were made on the C (core) layer of these specimen films, after the 5 layer films were exfoliated by gentle peeling. The C layer of each cast web was about 15 mils (0.38 mm) thick and the stretched C layer was about 1.2 mils (30 microns) thick.

The refractive indices of specimens of these Examples were measured using a Metricon Prism coupler (Metricon Corporation, Pennington, NJ) in the machine direction (MD), transverse direction (TD) and thickness (TM) directions. The refractive indices of MD, TD and TM are labeled Nx, Ny and Nz respectively. Average in-plane index represents the average of the Nx and Ny refractive index measurements for a given sample. Out-of-plane Birefringence represents the difference between the average in-plane index and the index normal to the film (Nz). % Haze was measured using a Haze-Gard instrument from BYK-Gardner USA, Columbia, MD. Haze was measured according to ASTM D-1003. In Table 3, "% T 370 nm" refers to % transmission of the isotropic cast web at 370 nm which was measured using a Shimadzu UV/Vis spectrometer (Shimadzu Scientific Instruments, Columbia, MD).

TABLE 3

| | | Stretched & Annealed Films | | | | | Cast Webs | | |
|---|---|---|---|---|---|---|---|---|---|
| Example | C Layer Material from Example No. | Avg. In-Plane Index (Nx, Ny) | Z-Direction Index (Nz) | Out-of-Plane Birefringence | % Haze | % T at 370 nm | Avg. In-Plane Index (Nx, Ny) | Z-Direction Index (Nz) | Out-of-Plane Birefringence |
| 4 | 1 (PENg30) | 1.630 | 1.626 | 0.004 | 0.16 | 7.5 | 1.629 | 1.624 | 0.005 |
| 5 | 2 (PENg40) | 1.627 | 1.623 | 0.004 | 0.13 | 8.2 | 1.626 | 1.621 | 0.005 |
| 6 | 3 (PENg50) | 1.623 | 1.620 | 0.003 | 0.09 | 9.7 | 1.621 | 1.616 | 0.005 |
| C4 | C3 (PENg60) | 1.634 | 1.603 | 0.030 | 0.38 | 13.0 | 1.619 | 1.614 | 0.004 |

Table 3 shows that cast webs for Examples 4, 5, 6 and Comparative Example C4 all exhibit low out-of-plane birefringence (<0.01). However, only Examples 4, 5 and 6 maintain a low level of out-of-plane birefringence (<0.01) after stretching and annealing. All Examples exhibited low % Haze. All Examples also exhibit high levels of UV blockage at 370 nm, with % T levels<10% for examples 4, 5, and 6.

Examples 7 Through 9

A series of 4-component 5-layer films in a C/A/D/B/C layer configuration were produced via co-extrusion, stretching, and annealing. These five layer films used a layer configuration consistent with FIG. 5. Materials inputs for these Examples of the CADBC film layer stack are shown in Table 4. Table 4

|  |  |  |  |  |  | D Layer |  |  | B layer |  |
|---|---|---|---|---|---|---|---|---|---|---|
|  | C Layers |  | A Layer |  |  | Kraton G1645 | P230 |  | SR549 | K1645 | P230 |
| Ex. | Resin | kg/hr | Resin | kg/hr | Resins | Kg/hr | kg/hr | Resins | kg/hr | kg/hr | kg/hr |
| 7 | PENg30 | 13.6 | Low Melt PEN | 13.6 | Kraton G1645 | 2.27 | 0 | SR549/Kraton G1645 | 2.04 | 0.23 | 0 |
| 8 | PENg30 | 13.6 | Low Melt PEN | 13.6 | Kraton G1645 | 2.27 | 0 | SR549/Pelelstat 230 | 2.04 | 0 | 0.23 |
| 9 | PENg30 | 13.6 | Low Melt PEN | 13.6 | G1645/Pelelstat 230 | 1.81 | 0.45 | SR549/Kraton G1645 | 2.04 | 0.23 | 0 |

Low Melt PEN refers to a 0.48 IV (g/dL) copolyester comprising 90 mol % naphthalate moieties and 10 mol % terephthalate moieties on an esters basis. The diol component is 100% ethylene glycol. Low Melt PEN was synthesized in-house.

Pelestat 230 refers to a polyether-polyolefin antistatic block copolymer available from Sanyo Chemical Industries, Kyoto, Japan.

For each film of Exs. 7-9 the outer, or C, Layers were produced by extruding PENg30 (as described in Example 1) resin with a 27 mm twin screw extruder (TSE) through a gear pump and neck tube into the outer layers of a 5-layer feed block. This melt train used a progressive temperature extrusion profile, with peak temperature of about 270 C. One intermediate layer, the B Layer, was produced by feeding both of the above-identified resins to an 18 mm TSE having a progressive temperature profile peaking at about 260 C, then to and through a gear pump and neck tube, and into the 4th layer of the 5-layer feed block. Another intermediate layer, the A Layer, was produced by feeding the above-identified resin to an 27 mm TSE having a progressive temperature profile peaking at about 285 C, then to and through a gear pump and neck tube, and into the 2nd layer of the 5-layer feed block. The center, or D, Layer was produced by extruding the above-identified resin through a 25 mm TSE with a gear pump and neck tube, feeding into the 3rd, or center, layer of the 5-layer feed block. Once again, a progressive temperature profile was used, with peak temperature of about 260 C. The feed block fed an 8" (20.3 cm) film die, and these were held at a temperature of about 285 C. The molten extrudate was cast to a casting wheel maintained at a temperature of about 50 C. Cast webs of about 24 mil (0.61 mm) thickness were produced during this process.

The cast webs produced from the extrusion and casting process were then stretched and annealed using a KARO IV lab stretcher obtained from Brueckner Maschinenbau, Siegsdorf, Germany. Stretching of the film took place in an oven at a temperature of about 140 C. Preheating duration was about 30 seconds. Films were stretched simultaneously biaxially to a final dimension of 350% by 350% of the original size, resulting in a finished film of about 2 mils (50 microns). These films were then conveyed into an annealing oven maintained at about 225 C and held at that temperature for 15 seconds. These stretched, annealed films were then evaluated for refractive index, haze, and peel force. The unstretched cast webs were also evaluated for refractive index. The results are shown in Table 5. All refractive index and haze measurements were made on the bottom C layer of these specimen films (the one adjacent to the B layer), after the 5 layer films were exfoliated by gentle peeling. The bottom C layer of each cast web was about 5 mils (0.13 mm) thick and the stretched C layer was about 0.4 mils (10 microns) thick.

Peel force of films was evaluated using an Imass SP-2100 (Imass, Inc., Marshfield, MA) using a standard 90 degree peel test. It should be noted that for all three Examples, the peel layer (B) and the isotropic layer (C) exhibit peel forces of less than 10 g/in (3.9 g/cm), while the tie layer (D) and the orienting layer (A) exhibit peel forces of greater than 500 g/in (200 g/cm). The peeled isotropic layer in these Examples exhibits low haze and low out-of-plane birefringence.

TABLE 5

|  |  |  |  |  | Stretched, Annealed Films |  |  |  |  |  |
|---|---|---|---|---|---|---|---|---|---|---|
| Ex. | C Layers Resin | A Layer Resin | D Layer Resin | B layer Resin | C/B Peel Force g/in | A/D Peel Force g/in | Bottom C Layer % Haze | Avg In-Plane Index (Nx, Ny) | Out-of-Plane Index (Nz) | Out-of-Plane Birefringence |
| 7 | PENg30 | Low Melt PEN | Kraton G1645 | SR549/Kraton G1645 | 6.2 | 1030 | 0.21 | 1.628 | 1.623 | 0.005 |

TABLE 5-continued

| | | | | | Stretched, Annealed Films | | | | | |
| Ex. | C Layers Resin | A Layer Resin | D Layer Resin | B layer Resin | C/B Peel Force g/in | A/D Peel Force g/in | Bottom C Layer % Haze | Avg In-Plane Index (Nx, Ny) | Out-of-Plane Index (Nz) | Out-of-Plane Birefringence |
|---|---|---|---|---|---|---|---|---|---|---|
| 8 | PENg30 | Low Melt PEN | Kraton G1645 | SR549/ Pelelstat 230 | 8.1 | 999 | 0.23 | 1.630 | 1.623 | 0.006 |
| 9 | PENg30 | Low Melt PEN | G1645/ Pelelstat 230 | SR549/ Kraton G1645 | 5 | 781 | 0.21 | 1.629 | 1.623 | 0.006 |

Solvent Resistance

The film described in Example 4 exhibit excellent solvent resistance to cyclohexanone, n-butyl acetate and propyl glycol methyl ether acetate when exposed to each of these solvents for 5 minutes at room temperature. No evidence of swelling, cracking, or distorting was apparent.

Additional Examples

A series of multi-layer films were produced via co-extrusion blown film process. The materials inputs for the examples of the ACA (FIG. 7) and ABCBA (FIG. 3) film layer stacks are provided in Table 6.

TABLE 6

| | 17-0825-01 | 17-0825-2 | 17-0825-3 | 17-0825-4 | 17-0825-5 | 17-0825-6 | 17-0825-7 | 17-0825-8 |
|---|---|---|---|---|---|---|---|---|
| Layer 1 | 611A Frac Melt LDPE | 611A Frac Melt LDPE | 611A Frac Melt LDPE | 611A Frac Melt LDPE | 611A Frac Melt LDPE | 611A Frac Melt LDPE | 611A Frac Melt LDPE | 611A Frac Melt LDPE |
| Thickness | 0.50 mils | 0.50 mils | 0.80 mils | 0.70 mils | 0.70 mils | 0.70 mils | 0.70 mils | 1.00 mils |
| Screw Speed | 40.0 RPM | 40.0 RPM | 60.0 RPM | 60.0 RPM | 60.0 RPM | 60.0 RPM | 60.0 RPM | 70.0 RPM |
| Layer 2 | 611A Frac Melt LDPE | 611A Frac Melt LDPE | 611A Frac Melt LDPE | 611A Frac Melt LDPE | 611A Frac Melt LDPE | 611A Frac Melt LDPE | 611A Frac Melt LDPE | 611A Frac Melt LDPE |
| Thickness | 0.50 mils | 0.50 mils | 0.80 mils | 0.70 mils | 0.70 mils | 0.70 mils | 0.70 mils | 1.00 mils |
| Screw Speed | 40.0 RPM | 40.0 RPM | 60.0 RPM | 60.0 RPM | 60.0 RPM | 60.0 RPM | 60.0 RPM | 70.0 RPM |
| Layer 3 | 611A Frac Melt LDPE | 611A Frac Melt LDPE | 611A Frac Melt LDPE | PP SR549/Kraton 1657 (90/10) | 611A Frac Melt LDPE/Elvaloy 1125 (50/50) | 611A Frac Melt LDPE/Elvaloy 1125 (75/25)) | 611A Frac Melt LDPE/Elvaloy 1125 (90/10) | 611A Frac Melt LDPE |
| Thickness | 0.50 mils | 0.50 mils | 0.80 mils | 0.30 mils | 0.30 mils | 0.30 mils | 0.30 mils | 1.00 mils |
| Screw Speed | 40.0 RPM | 40.0 RPM | 60.0 RPM | 25.7 RPM | 25.7 RPM | 25.7 RPM | 25.7 RPM | 70.0 RPM |
| Layer 4 | PENg30 | PENg40 | PENg40 | PENg40 | PENg40 | PENg40 | PENg40 | PENg40 |
| Thickness | 1.00 mils | 1.00 mils | 1.00 mils | 1.00 mils | 1.00 mils | 1.00 mils | 1.00 mils | 1.00 mils |
| Screw Speed | 80.0 RPM | 80.0 RPM | 75.0 RPM | 85.7 RPM | 85.7 RPM | 85.7 RPM | 85.7 RPM | 70.0 RPM |
| Layer 5 | PENg30 | PENg40 | PENg40 | PENg40 | PENg40 | PENg40 | PENg40 | PENg40 |
| Thickness | 1.00 mils | 1.00 mils | 1.00 mils | 1.00 mils | 1.00 mils | 1.00 mils | 1.00 mils | 1.00 mils |
| Screw Speed | 80.0 RPM | 80.0 RPM | 75.0 RPM | 85.7 RPM | 85.7 RPM | 85.7 RPM | 85.7 RPM | 70.0 RPM |
| Layer 6 | 611A Frac Melt LDPE | 611A Frac Melt LDPE | 611A Frac Melt LDPE | PP SR549/Kraton 1657 (90/10) | 611A Frac Melt LDPE/Elvaloy 1125 (50/50) | 611A Frac Melt LDPE | 611A Frac Melt LDPE | 611A Frac Melt LDPE |
| Thickness | 0.75 mils | 0.75 mils | 0.40 mils | 0.30 mils | 0.30 mils | 0.30 mils | 0.30 mils | 1.00 mils |
| Screw Speed | 60.0 RPM | 60.0 RPM | 30.0 RPM | 25.7 RPM | 25.7 RPM | 25.7 RPM | 25.7 RPM | 70.0 RPM |
| Layer 7 | 611A Frac Melt LDPE | 611A Frac Melt LDPE | 611A Frac Melt LDPE | 611A Frac Melt LDPE | 611A Frac Melt LDPE | 611A Frac Melt LDPE | 611A Frac Melt LDPE | 611A Frac Melt LDPE |
| Thickness | 0.75 mils | 0.75 mils | 0.40 mils | 1.25 mils | 1.25 mils | 1.25 mils | 1.25 mils | 1.00 mils |
| Screw Speed | 60.0 RPM | 60.0 RPM | 30.0 RPM | 107.1 RPM | 107.1 RPM | 107.1 RPM | 107.1 RPM | 70.0 RPM |
| Overall | 5.0 mils | 5.0 mils | 5.2 mils | 5.3 mils | 5.3 mils | 5.3 mils | 5.3 mils | 7.0 mils |

13

The skin layers (A) were produced by extruding DOW611A polyethylene resin through 20 mm single screw extruders with about a 30:1 length to diameter ratio and adapters into layers 1, 2, 3, 6, and 7 of a seven-layer annular stack die (obtained under the trade designation "COEX 7-LAYER" (Type LF-400) from Labtech Engineering, Samutprakarn, Thailand). These melt trains used a progressive temperature extrusion profile, with peak temperatures of ~210 C. The core layers (C) were produced by extruding the above-identified resins through an 20 mm single screw extruders with about a 30:1 length to diameter ratio and adapters into the 4$^{th}$ and 5$^{th}$ layers of the seven-layer annular stack die. These melt trains used a progressive temperature extrusion profile, with peak temperatures around 255 C. The pancake die and mandrel were held at a target temperature of 227 C. The blower motor output was held around 3000 rpm. The bubble was subsequently collapsed about ten feet above the die and rolled up.

The films produced were measured for transmission, haze, and refractive index, as listed in Table 7. The PENg30/40 sample target thicknesses were targeting a 1.5 mil film.

14

TABLE 7

|  | Transmission | Haze | Nx, Ny | Nz | Birefringence |
|---|---|---|---|---|---|
| 17-0825-1 | 89.7 | 3.0 | 1.625 | 1.631 | 0.006 |
| 17-0825-2 | 90.0 | 1.8 | 1.623 | 1.629 | 0.006 |
| 17-0825-3 | 90.0 | 1.3 | 1.624 | 1.623 | 0.001 |
| 17-0825-4 | 90.0 | 3.3 | 1.623 | 1.627 | 0.004 |
| 17-0825-5 | Film Sample Inseperable | | | | |
| 17-0825-6 | 89.4 | 8.6 | 1.626 | 1.623 | 0.003 |
| 17-0825-7 | 89.8 | 4.8 | 1.621 | 1.624 | 0.004 |
| 17-0825-8 | 89.9 | 1.9 | 1.628 | 1.622 | 0.006 |

As shown in Table 7, the samples haze are above the target of 1%. This is attributed to the cooling capability on the small scale line. As also shown in Table 7, the birefringence for these samples are under the target of 0.005. This demonstrates these films are considered isotropic.

Samples were also produced using a 9 layer annular stack dieblown film line, provided by Brampton Engineering. The sample constructions are detailed in Table 8.

TABLE 8

| I | Material | Dow LD 611A PURGE RESIN | Dow LD 611A PURGE RESIN | Dow LD 611A PURGE RESIN | Dow LD 611A PURGE RESIN |
|---|---|---|---|---|---|
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |
| | Layer % | 12.1 | 11.71 | 10.94 | 9.38 |
| | Caliper | 0.95 | 0.93 | 0.88 | 0.75 |
| H | Material | Dow LD 611A PURGE RESIN | Dow LD 611A PURGE RESIN | Dow LD 611A PURGE RESIN | Dow LD 611A PURGE RESIN |
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |
| | Layer % | 12.1 | 11.71 | 10.94 | 9.38 |
| | Caliper | 0.95 | 0.93 | 0.88 | 0.75 |
| G | Material | Dow LD 611A PURGE RESIN | Dow LD 611A PURGE RESIN | Dow LD 611A PURGE RESIN | Dow LD 611A PURGE RESIN |
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |
| | Layer % | 12.1 | 11.71 | 10.94 | 9.38 |
| | Caliper | 0.95 | 0.93 | 0.88 | 0.75 |
| F | Material | Dow LD 611A PURGE RESIN | Dow LD 611A PURGE RESIN | Dow LD 611A PURGE RESIN | Dow LD 611A PURGE RESIN |
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |
| | Layer % | 12.1 | 11.71 | 10.94 | 9.38 |
| | Caliper | 0.95 | 0.93 | 0.88 | 0.75 |
| E | Material | PENg30 | PENg30 | PENg30 | PENg30 |
| | 3M Nbr | 41-5599-0320-2 | 41-5599-0320-2 | 41-5599-0320-2 | 41-5599-0320-2 |
| | Ratio | 100 | 100 | 100 | 100 |
| | Density | 1.39 | 1.39 | 1.39 | 1.39 |
| | Layer % | 3.18 | 6.3 | 12.5 | 25 |
| | Caliper | 0.25 | 0.5 | 1 | 2 |
| D | Material | Dow LD 611A PURGE RESIN | Dow LD 611A PURGE RESIN | Dow LD 611A PURGE RESIN | Dow LD 611A PURGE RESIN |
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |
| | Layer % | 12.1 | 11.71 | 10.94 | 9.38 |
| | Caliper | 0.95 | 0.93 | 0.88 | 0.75 |
| C | Material | Dow LD 611A PURGE RESIN | Dow LD 611A PURGE RESIN | Dow LD 611A PURGE RESIN | Dow LD 611A PURGE RESIN |
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |
| | Layer % | 12.1 | 11.71 | 10.94 | 9.38 |
| | Caliper | 0.95 | 0.93 | 0.88 | 0.75 |
| B | Material | Dow LD 611A PURGE RESIN | Dow LD 611A PURGE RESIN | Dow LD 611A PURGE RESIN | Dow LD 611A PURGE RESIN |
| | 3M Nbr | 11002598453 | 11002598453 | 11002598453 | 11002598453 |
| | Ratio | 100 | 100 | 100 | 100 |
| | Density | 0.924 | 0.924 | 0.924 | 0.924 |

TABLE 8-continued

|   | Layer % | 12.1 | 11.71 | 10.94 | 9.38 |
|---|---|---|---|---|---|
|   | Caliper | 0.95 | 0.93 | 0.88 | 0.75 |
| A | Material | Dow LD 611A | Dow LD 611A | Dow LD 611A | Dow LD 611A |
|   |   | PURGE RESIN | PURGE RESIN | PURGE RESIN | PURGE RESIN |
|   | 3M Nbr | 11002598453 | 11002598453 | 11002598453 | 11002598453 |
|   | Ratio | 100 | 100 | 100 | 100 |
|   | Density | 0.924 | 0.924 | 0.924 | 0.924 |
|   | Layer % | 112.1 | 111.71 | 10.94 | 9.38 |
|   | Caliper | 0.95 | 0.93 | 0.88 | 0.75 |

The outer layers (A) were produced by extruding DOW611A polyethylene resin through 2.5 inch single screw extruders through adapters into layers 1, 2, 3, 4, 6, 7, 8, and 9 of a nine-layer pancake blown film die. These melt trains used a progressive temperature extrusion profile, with peak temperatures of ~200 C. The core layer (C) was produced by extruding the above-identified resin through a 2 inch single screw extruder with an adapter and dump valve into the $5^{th}$ layer of the nine-layer pancake blown film die. This melt train used a progressive temperature extrusion profile, with a peak temperature around 255 C. The pancake die and mandrel were held at a target temperature of 220 C.

The transmission, haze, and refractive index for these samples are listed in Table 9. These samples range in thickness from 0.25 mil to 2 mil. All the film samples were made from PENg30 except for sample 17-0825-3. This sample was made from PENg40. This explains the difference in refractive index.

TABLE 9

| | | | | | Refractive index measurements Nx/Ny | | | | | | | PENg Thickness |
|---|---|---|---|---|---|---|---|---|---|---|---|---|
| Sample | % Transmission | % Haze | 0° | 30° | 60° | 90° | 120° | 150° | 180° | Nz | (mil) |
| 17-0825-1 | 90.4 | 3.3 | 1.629 | 1.629 | 1.629 | 1.629 | 1.629 | 1.630 | 1.629 | 1.624 | 2.00 |
| 17-0825-3 | 90.6 | 1.7 | 1.628 | 1.625 | 1.626 | 1.628 | 1.628 | 1.626 | 1.623 | 1.620 | 2.60 |
| 17-1208-1 | 90.2 | 0.6 | 1.630 | 1.633 | 1.641 | 1.644 | 1.641 | 1.632 | 1.630 | 1.608 | 0.50 |
| 17-1208-2 | 90.3 | 0.7 | 1.629 | 1.634 | 1.640 | 1.642 | 1.639 | 1.632 | 1.642 | 1.614 | 0.25 |
| 17-1208-3 | 90.4 | 1.3 | 1.629 | 1.633 | 1.637 | 1.638 | 1.635 | 1.631 | 1.628 | 1.617 | 1.00 |
| 17-1208-4 | 90.4 | 0.7 | 1.629 | 1.630 | 1.632 | 1.633 | 1.632 | 1.630 | 1.633 | 1.622 | 2.00 |

For the most part as shown in Table 8, haze is below 1% and transmission is higher than 90%, which are the targets for optically clear film. The refractive index of the film does change based on the angle the index is measured. This is attributed to the forming ratio. As the forming ratio gets closer to 1, the film exhibits more balanced orientation.

Films have been made demonstrating the configurations ACDCA and ADA shown in FIGS. 9 and 10, respectively. The sample constructions are detailed in Table 10.

TABLE 10

| | 17-1219-5 | 17-1219-6 | 17-1219-7 | 17-1219-8 | 17-1219-9 |
|---|---|---|---|---|---|
| Layer 1 | Frac Melt LDPE 611A | Frac Melt LDPE 611A | Frac Melt LDPE 611A | Frac Melt LDPE 611A | Frac Melt LDPE 611A |
| Thickness | 0.50 mils | 0.50 mils | 0.50 mils | 0.50 mils | 0.50 mils |
| Screw Speed | 60.4 RPM | 60.4 RPM | 60.4 RPM | 60.4 RPM | 60.4 RPM |
| Layer 2 | Frac Melt LDPE 611A | Frac Melt LDPE 611A | Frac Melt LDPE 611A | Frac Melt LDPE 611A | Frac Melt LDPE 611A |
| Thickness | 0.50 mils | 0.50 mils | 0.50 mils | 0.50 mils | 0.50 mils |
| Screw Speed | 60.5 RPM | 60.5 RPM | 60.5 RPM | 60.5 RPM | 60.5 RPM |
| Layer 3 | Frac Melt LDPE 611A | Frac Melt LDPE 611A | Frac Melt LDPE 611A | PENg30 | PENg30 |
| Thickness | 0.50 mils | 0.50 mils | 0.50 mils | 0.50 mils | 0.50 mils |
| Screw Speed | 60.5 RPM | 60.5 RPM | 60.5 RPM | 29.9 RPM | 14.5 RPM |
| Layer 4 | Makrolon 2205 | Makrolon 2205 | Makrolon 2205 | Makrolon 2205 | Makrolon 2205 |
| Thickness | 1.00 mils | 1.00 mils | 1.00 mils | 1.00 mils | 1.00 mils |
| Screw Speed | 14.5 RPM | 19.7 RPM | 14.5 RPM | 14.5 RPM | 19.7 RPM |
| Extruder Profile | Zone 1 - 480F | Zone 1 - 480F | Zone 1 - 480F | Zone 1 - 480F | Zone 1 - 480F |
| | Zone 2 - 520F | Zone 2 - 520F | Zone 2 - 520F | Zone 2 - 520F | Zone 2 - 520F |
| | Zone 3 - 530F | Zone 3 - 530F | Zone 3 - 530F | Zone 3 - 530F | Zone 3 - 530F |
| | Adapter - 530F | Adapter - 530F | Adapter - 530F | Adapter - 530F | Adapter - 530F |
| | Pipe - 510F | Pipe - 510F | Pipe - 510F | Pipe - 510F | Pipe - 510F |
| Layer 5 | Frac Melt LDPE 611A | Frac Melt LDPE 611A | Frac Melt LDPE 611A | PENg30 | PENg30 |
| Thickness | 0.50 mils | 0.50 mils | 0.50 mils | 0.50 mils | 0.50 mils |
| Screw Speed | 60.4 RPM | 60.4 RPM | 60.4 RPM | 29.6 RPM | 14.3 RPM |
| Layer 6 | Frac Melt LDPE 611A | Frac Melt LDPE 611A | Frac Melt LDPE 611A | Frac Melt LDPE 611A | Frac Melt LDPE 611A |
| Thickness | 0.50 mils | 0.50 mils | 0.50 mils | 0.50 mils | 0.50 mils |
| Screw Speed | 60.3RPM | 60.3 RPM | 60.3 RPM | 60.3 RPM | 60.3 RPM |

TABLE 10-continued

|  | 17-1219-5 | 17-1219-6 | 17-1219-7 | 17-1219-8 | 17-1219-9 |
|---|---|---|---|---|---|
| Layer 7 | Frac Melt LDPE 611A | Frac Melt LDPE 611A | Frac Melt LDPE 611A | Frac Melt LDPE 611A | Frac Melt LDPE 611A |
| Thickness | 0.50 mils | 0.50 mils | 0.50 mils | 0.50 mils | 0.50 mils |
| Screw Speed | 60.4 RPM | 60.4 RPM | 60.4 RPM | 60.4 RPM | 60.4 RPM |
| Overall | 6.0 mils | 6.0 mils | 6.0 mils | 6.0 mils | 6.0 mils |

The skin layers (A) were produced by extruding DOW611A polyethylene resin through 20 mm single screw extruders with about a 30:1 length to diameter ratio and adapters into layers 1, 2, 6, and 7 of a seven-layer annular stack die (obtained under the trade designation "COEX 7-LAYER" (Type LF-400) from Labtech Engineering, Sam-utprakarn, Thailand). These melt trains used a progressive temperature extrusion profile, with peak temperatures of ~210 C. The core layers (C) were produced by extruding the above-identified resins through an 20 mm single screw extruders with about a 30:1 length to diameter ratio and adapters into the 3$^{rd}$, 4$^{th}$ and 5$^{th}$ layers of the seven-layer annular stack die. These melt trains used a progressive temperature extrusion profile, with peak temperatures around 265 C. The annular stack die and mandrel were held at a target temperature of 265 C. The blower motor output was held around 1800 rpm.

Retardance and birefringence numbers from these films are listed in Table 11.

TABLE 11

|  | Nx | Ny | Nz | Birefringence |
|---|---|---|---|---|
| 17-1219-5 | 1.580 | 1.581 | 1.579 | 0.002 |
| 17-1219-6 | 1.581 | 1.580 | 1.579 | 0.002 |

TABLE 11-continued

|  | Nx | Ny | Nz | Birefringence |
|---|---|---|---|---|
| 17-1219-7 | 1.580 | 1.581 | 1.579 | 0.002 |
| 17-1219-8 | 1.636 | 1.637 | 1.635 | 0.002 |
| 17-1219-9 | 1.637 | 1.637 | 1.635 | 0.002 |

The invention claimed is:

1. A multi-layer film, comprising in the following order:

an orienting layer comprising polyester;

a tie layer comprising an elastic olefin or olefin blend;

a peel layer comprising 70% or more polypropylene and a SEBS or SEPS block copolymer; and an isotropic layer, comprising a naphthalate based copo-lymer, wherein the tie layer keeps the orienting layer and the peel layer together, the orienting layer, the peel layer, and the isotropic layer all comprise an extrudable material and are co-oriented, the peel layer provides 5 to 40 g/in of adhesion to the isotropic layer when measured using a 90° peel test.

* * * * *